United States Patent

Kirigaya et al.

Patent Number: 6,085,046

Date of Patent: Jul. 4, 2000

[54] DEVICE FOR PROCESSING DIGITAL DATA OF A DX CODE

[75] Inventors: Tadayuki Kirigaya; Tetsuo Hosokawa, both of Tokyo; Satoshi Takami, Tsurugashimi-machi, all of Japan

[73] Assignee: Asahi Kogaku Kogyo Kabushiki Kaisha, Tokyo, Japan

[21] Appl. No.: 08/068,584

[22] Filed: May 28, 1993

Related U.S. Application Data

[63] Continuation of application No. 07/588,558, Sep. 26, 1990, abandoned.

[30] Foreign Application Priority Data

Sep. 28, 1989 [JP] Japan ..................................... 1-253186

[51] Int. Cl.⁷ .................................................. G06F 19/00
[52] U.S. Cl. ............................ 396/208; 396/213; 712/36
[58] Field of Search ..................... 395/375, 800; 396/207, 213, 208; 712/36

[56] References Cited

U.S. PATENT DOCUMENTS

| | | | |
|---|---|---|---|
| 4,286,849 | 9/1981 | Uchidoi et al. | 354/230 |
| 4,431,283 | 2/1984 | Hoda et al. | 354/21 |
| 4,692,005 | 9/1987 | Takami | 396/208 |
| 4,702,579 | 10/1987 | Ogihara et al. | 396/208 |
| 4,746,879 | 5/1988 | Ma et al. | 331/44 |
| 4,812,862 | 3/1989 | Fujino et al. | 396/208 |
| 4,896,262 | 1/1990 | Wayana et al. | 364/200 |
| 4,965,668 | 10/1990 | Abt et al. | 358/160 |
| 5,030,979 | 7/1991 | Kobayashi et al. | 396/208 |
| 5,036,342 | 7/1991 | Hoda et al. | 396/208 |
| 5,051,889 | 9/1991 | Fung et al. | 364/200 |
| 5,075,710 | 12/1991 | Taniguchi et al. | 354/289.12 |
| 5,111,234 | 5/1992 | Taniguchi et al. | 354/455 |
| 5,122,820 | 6/1992 | Pagano et al. | 354/21 |
| 5,159,364 | 10/1992 | Yanagisawa et al. | 396/207 |

FOREIGN PATENT DOCUMENTS 0270259  8/1988  United Kingdom .

OTHER PUBLICATIONS

Uffenbeck, J. "Microcomputers and Microprocessors: The 8080,8085, and 7–80 Programming, Interfacing, and Trouble–shooting", Prentice–Hall Publish., ISBN:0–13–580309–8 Copyright 1985, pp. 419–425,—error detection & correction & the Hamming code.

*Primary Examiner*—William M. Treat
*Attorney, Agent, or Firm*—Greenblum & Bernstein, P.L.C.

[57] ABSTRACT

A device for processing digital data receives digital data with a number of original digital data being reduced in a predetermined manner, discriminates whether a predetermined reference part of the received digital data meets a predetermined condition, sets a value corresponding to a remaining part of the received digital data, and modifies the value in a predetermined way if the reference part meets the predetermined condition.

6 Claims, 4 Drawing Sheets

DEVICE FOR PROCESSING DIGITAL DATA OF A DX CODE

This application is a continuation of application Ser. No. 07/588,558, filed Sep. 26, 1990, now abandoned.

BACKGROUND OF THE INVENTION

The present invention relates to a device for processing digital data, and more specifically, to a device for processing digital data that is to be employed in an arithmetic operation device for executing an arithmetic operation, such as an exposure control for a camera, based upon input data, such as film sensitivity, shutter speed, and the like.

Conventionally, an arithmetic operation device has employed a device for processing digital data in which the number of bits (or digits) representing an original data is reduced by deleting a predetermined part of the digital data when the digital data is inputted in order to reduce a load imposed on a CPU by simplifying input data, and to reduce manufacturing cost by simplifying an input means itself.

Nevertheless, conventional converting device produce an increased error to an intended control, and thus, are not suitable, because it executes an arithmetic operation in coarse steps by ignoring deleted parts of the digital data or continues the arithmetic operation by assuming that the deleted bit is set to a predetermined value.

As an example, an automatic setting of a film sensitivity executed based on a conventional DX input will be described.

FIG. 4 shows a film patrone on which a DX code is printed to indicate the film sensitivity. The DX code is separated into electric conductive portions and insulated portions within a range from R1 to R12. The electric conductive portions are composed of an exposed metal and the insulated portions are coated. Portions R1 and R7 are used as a ground, and the film sensitivity is represented by a combination of the range from R2 to R6.

When a full range film sensitivity is obtained from a camera, six signal pins (one of which is ground) corresponding to respective ISO ranges are used, and the camera reads ISO 25–5000 in ⅓ Ev steps as shown in Table 1. It should be noted that an APEX system (additive system of photographic exposure) is generally employed for calculating an exposure time. In this system, the exposure value Ev is described as follows.

$$Av+Tv=Bv+Sv=Ev$$

wherein Av is an aperture value, Tv is a time value (representing a shutter speed), Bv is a brightness value, Sv is a speed value (representing a film sensitivity), and Ev is an exposure value.

In the case of a low price camera, the number of signal pins are typically reduced to 4, so as to reduce manufacturing costs. Thus, a reading step is in 1 Ev increments, as shown in Table 2. In this case, a single Sv represents three different values of ISO, which is so coarse that a problem arises in accuracy, when it is applied to the exposure control of a single lens reflex camera.

If 5 pins are employed, as shown in Table 3, it is not possible to discriminate ⅓ Ev from ⅔ Ev. If they are indiscriminately rounded to any one side, a value which is actually 1+⅓ Ev is input as 1+⅔ Ev, for example, causing a maximum exposure error of ⅓ Ev.

Further, when a direction in which rounding is carried out is fixed to any one of ⅓ Ev or ⅔ Ev, a setting may be made to accept a less frequently used film sensitivity when the less frequently used film sensitivity and a more frequently used film sensitivity

TABLE 1

| | DX PIN | | | | | |
|---|---|---|---|---|---|---|
| ISO | 6 | 5 | 4 | 3 | 2 | Sv |
| 25 | 1 | 0 | 1 | 1 | 1 | 3 |
| 32 | 0 | 1 | 1 | 1 | 1 | 3 ⅓ |
| 40 | 0 | 0 | 1 | 1 | 1 | 3 ⅔ |
| 50 | 1 | 0 | 1 | 1 | 0 | 4 |
| 64 | 0 | 1 | 1 | 1 | 0 | 4 ⅓ |
| 80 | 0 | 0 | 1 | 1 | 0 | 4 ⅔ |
| 100 | 1 | 0 | 1 | 0 | 1 | 5 |
| 125 | 0 | 1 | 1 | 0 | 1 | 5 ⅓ |
| 160 | 0 | 0 | 1 | 0 | 1 | 5 ⅔ |
| 200 | 1 | 0 | 1 | 0 | 0 | 6 |
| 250 | 0 | 1 | 1 | 0 | 0 | 6 ⅓ |
| 320 | 0 | 0 | 1 | 0 | 0 | 6 ⅔ |
| 400 | 1 | 0 | 0 | 1 | 1 | 7 |
| 500 | 0 | 1 | 0 | 1 | 1 | 7 ⅓ |
| 640 | 0 | 0 | 0 | 1 | 1 | 7 ⅔ |
| 800 | 1 | 0 | 0 | 1 | 0 | 8 |
| 1000 | 0 | 1 | 0 | 1 | 0 | 8 ⅓ |
| 1250 | 0 | 0 | 0 | 1 | 0 | 8 ⅔ |
| 1600 | 1 | 0 | 0 | 0 | 1 | 9 |
| 2000 | 0 | 1 | 0 | 0 | 1 | 9 ⅓ |
| 2500 | 0 | 0 | 0 | 0 | 1 | 9⅔ |
| 3200 | 1 | 0 | 0 | 0 | 0 | 10 |
| 4000 | 0 | 1 | 0 | 0 | 0 | 10 ⅓ |
| 5000 | 0 | 0 | 0 | 0 | 0 | 10 ⅔ | are to be selected. If a less frequently used film sensitivity is set for representing both the less frequently used film and the frequently used film, the possibility of causing an exposure error is increased.

TABLE 2

| | PIN | | | |
|---|---|---|---|---|
| ISO | 4 | 3 | 2 | Sv |
| 25 | 1 | 1 | 1 | 3 |
| 32 | 1 | 1 | 1 | 3 |
| 40 | 1 | 1 | 1 | 3 |
| 50 | 1 | 1 | 0 | 4 |
| 64 | 1 | 1 | 0 | 4 |
| 80 | 1 | 1 | 0 | 4 |
| 100 | 1 | 0 | 1 | 5 |
| 125 | 1 | 0 | 1 | 5 |
| 160 | 1 | 0 | 1 | 5 |
| 200 | 1 | 0 | 0 | 6 |
| 250 | 1 | 0 | 0 | 6 |
| 320 | 1 | 0 | 0 | 6 |
| 400 | 0 | 1 | 1 | 7 |
| 500 | 0 | 1 | 1 | 7 |
| 640 | 0 | 1 | 1 | 7 |
| 800 | 0 | 1 | 0 | 8 |
| 1000 | 0 | 1 | 0 | 8 |
| 1250 | 0 | 1 | 0 | 8 |
| 1600 | 0 | 0 | 1 | 9 |
| 2000 | 0 | 0 | 1 | 9 |
| 2500 | 0 | 0 | 1 | 9 |
| 3200 | 0 | 0 | 0 | 10 |
| 4000 | 0 | 0 | 0 | 10 |
| 5000 | 0 | 0 | 0 | 10 |

TABLE 3

| ISO | PIN | | | | Sv |
| --- | --- | --- | --- | --- | --- |
| | 6 | 4 | 3 | 2 | |
| 25 | 1 | 1 | 1 | 1 | 3 |
| 32 | 0 | 1 | 1 | 1 | 3 ? |
| 40 | 0 | 1 | 1 | 1 | 3 ? |
| 50 | 1 | 1 | 1 | 0 | 4 |
| 64 | 0 | 1 | 1 | 0 | 4 ? |
| 80 | 0 | 1 | 1 | 0 | 4 ? |
| 100 | 1 | 1 | 0 | 1 | 5 |
| 125 | 0 | 1 | 0 | 1 | 5 ? |
| 160 | 0 | 1 | 0 | 1 | 5 ? |
| 200 | 1 | 1 | 0 | 0 | 6 |
| 250 | 0 | 1 | 0 | 0 | 6 ? |
| 320 | 0 | 1 | 0 | 0 | 6 ? |
| 400 | 1 | 0 | 1 | 1 | 7 |
| 500 | 0 | 0 | 1 | 1 | 7 ? |
| 640 | 0 | 0 | 1 | 1 | 7 ? |
| 800 | 1 | 0 | 1 | 0 | 8 |
| 1000 | 0 | 0 | 1 | 0 | 8 ? |
| 1250 | 0 | 0 | 1 | 0 | 8 ? |
| 1600 | 1 | 0 | 0 | 1 | 9 |
| 2000 | 0 | 0 | 0 | 1 | 9 ? |
| 2500 | 0 | 0 | 0 | 1 | 9 ? |
| 3200 | 1 | 0 | 0 | 0 | 10 |
| 4000 | 0 | 0 | 0 | 0 | 10 ? |
| 5000 | 0 | 0 | 0 | 0 | 10 ? |

SUMMARY OF THE INVENTION

Taking the above into consideration, it is an object of the present invention to provide a device for processing digital data that is inputted with the number of bits being reduced that is capable of minimizing an error to an intended control, and optionally, is capable of setting a numeral value in accordance with the frequency in use.

For the above objects, according to the invention, there is provided an improved device for processing digital data, comprising:

means for receiving the digital data in such a state as a predetermined reference part of the digital data is rounded off;

means for discriminating whether the predetermined reference part is in a predetermined condition, the remaining part of the digital data being a significant part; and means for setting a value corresponding to the significant part of the digital data, the setting means modifying the value if the reference part is in the predetermined condition.

According to another aspect of the invention there is provided a method for processing digital data, comprising the steps of:

receiving the digital data with the number of original digital data being reduced in a predetermined manner;

discriminating whether a predetermined reference part of the received digital data is in a predetermined condition;

setting a value corresponding to the remaining part of the received digital data;

modifying the value in a predetermined way if the reference part is in the predetermined condition.

DESCRIPTION OF THE ACCOMPANYING DRAWINGS

DESCRIPTION OF THE EMBODIMENTS

Figure 1:
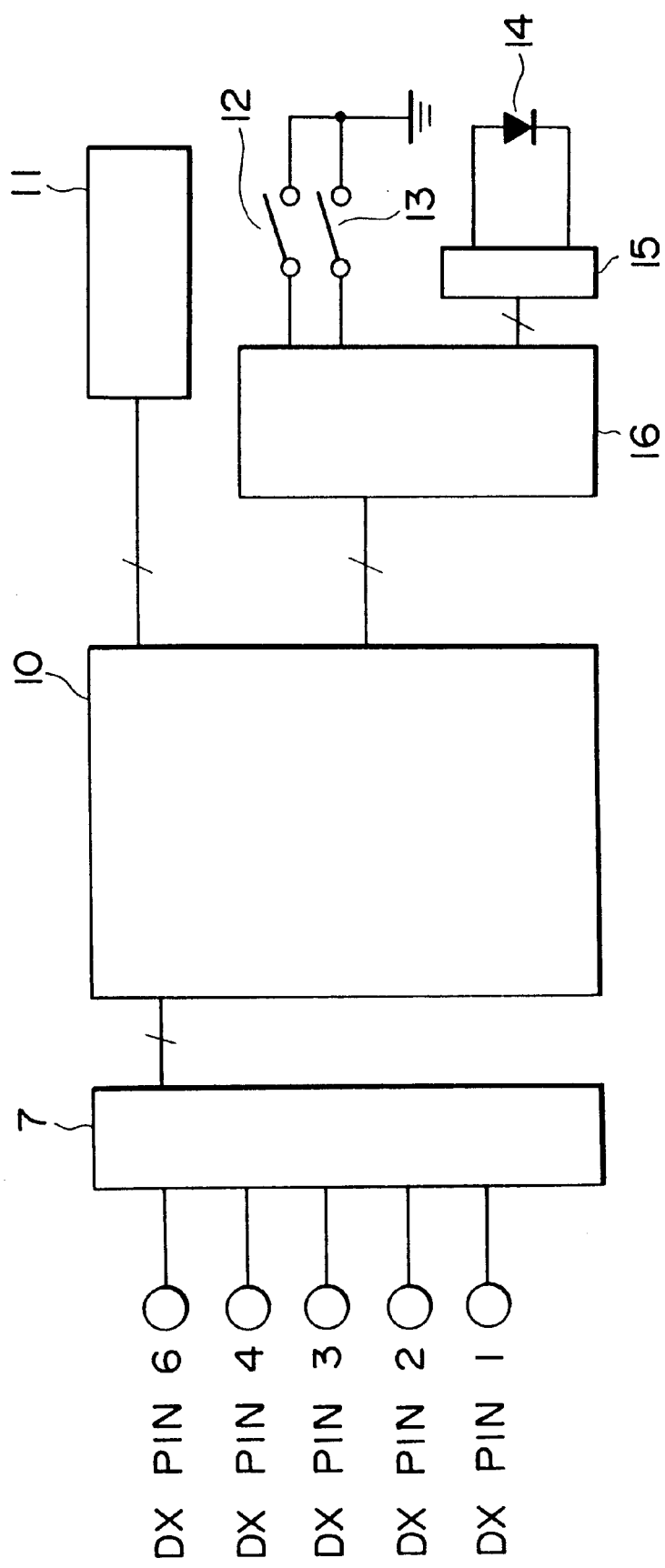
FIG. 1 is a block diagram of a main part of the arithmetic operation system employing a device for processing digital data, which is a first embodiment of the present invention.
Figure 2:
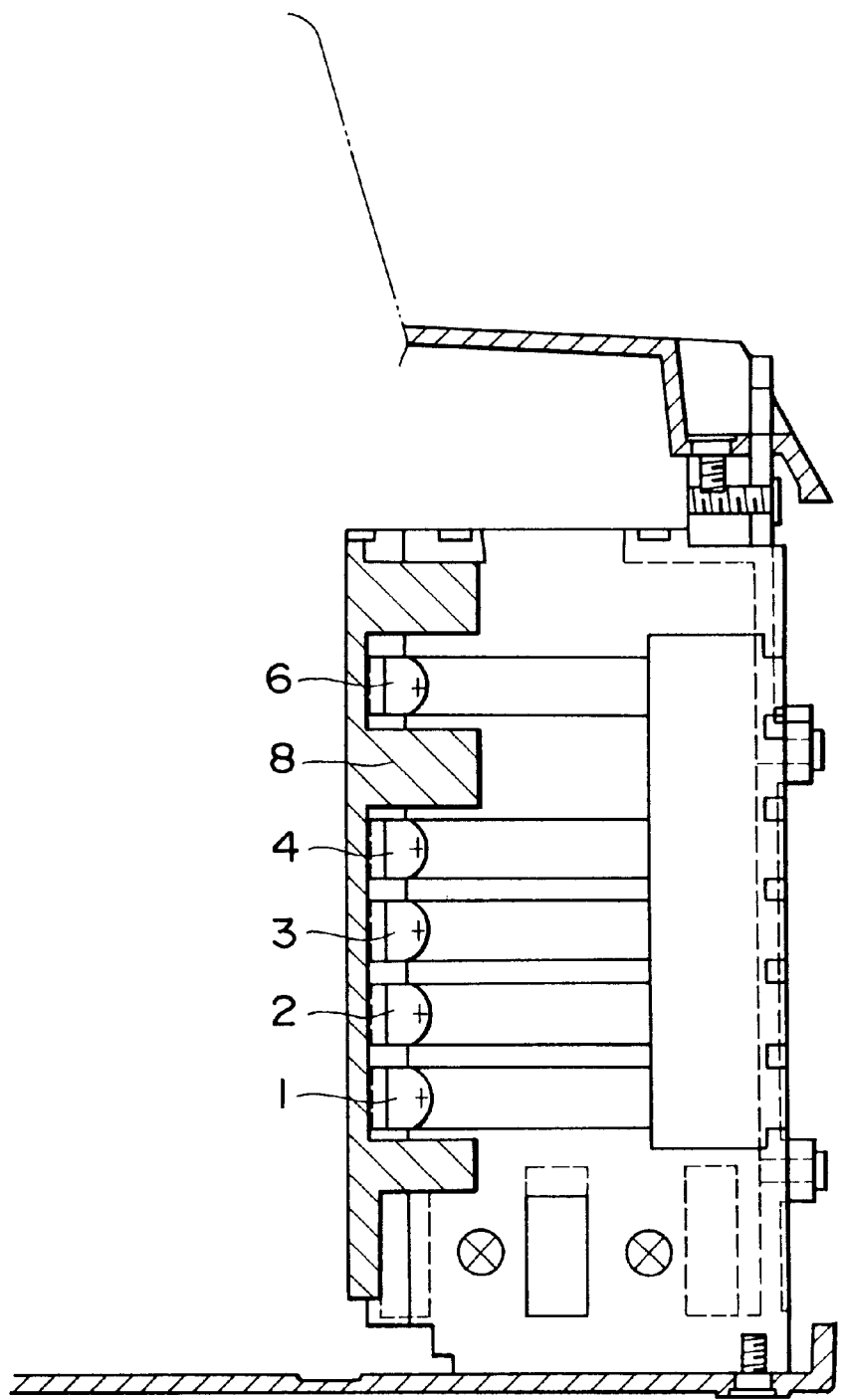
FIG. 2 is a diagram explaining a patrone chamber of a camera when one of bit is ignored.

FIGS. 1 and 2 show a first embodiment of a device for processing digital data embodying the present invention.

This embodiment is used to set a film sensitivity using the aforementioned DX input in which input data is composed of 5 bits, which are 1 bit less than a full range of 6 bits.

The data processing device of the present embodiment comprises DX pins 1, 2, 3, 4, and 6 FIG. 1 as a data input unit, a data processing device 7 for setting a film sensitivity based on the 5 bit input data, which are detected from a conductive state of these pins, and an arithmetic operation means 10 for executing an exposure arithmetic operation based on an output from the data processing device 7.

A shutter circuit 11 is driven based upon an output from a arithmetic operation means 10. A light measuring switch 12 which is turned on when a release button (not shown) is depressed halfway, a release switch 13 is turned on when the release button is fully depressed, and a photo-electric conversion circuit 15, to which a light receiving element 14 is connected are connected to the arithmetic operation means 10, respectively, through an interface 16.

As shown in FIG. 2, the input means is composed of the 5 DX pins 1, 2, 3, 4, and 6, which are exposed in a patrone chamber of a camera. The DX pin 1 serves as a ground.

Note that, the DX pins 2, 3, and 4 detect digital data representing a first data portion (integer part) of the Sv value, which is measured in 1 Ev increments, while pin 6 detects a second data portion (decimal fraction) of the Sv value, which is measured in less than 1 Ev step which is only 0 or 1. When there is a value which is less than 1 Sv, that is, when a value of the DX pin 6 is 0 in Table 4, the data processing device 7 sets a value of the second data portion to ½ Ev which a ½ increment of the first data portion.

In this embodiment, DX pin 5 is omitted so that one of five bits representing the Sv value is deleted. In this case, errors caused when a deleted bit is effective, and errors to be caused when the deleted bit is not effective are leveled out with each other. Thus, a maximum error of only ⅙ Ev can occur, whereby an accuracy which is applicable to a single lens reflex camera can be ensured, while reducing the manufacturing costs by reducing the number of needed pins by one.

Next, a modification for setting a film sensitivity will be described.

In the above embodiment, a film sensitivity setting error can be lowered to one half of a conventional maximum value of ⅓ Ev. But, when there is a value less than 1 Sv in an original Sv value, an error of ⅙ Ev always exists in the converted Ev value. On the other hand, films having all kinds of sensitivity are not used with the same frequency, but their frequency in use is deviated.

Therefore, when a value less than 1 Ev exists in the original Sv value, a film sensitivity is set to that of the films which are more frequently sold. When one of two films having a different film sensitivity is selected, the film sensitivity of the film which is more frequently used should be selected. This modification can sufficiently comply with the requirement of a general application.

TABLE 4

| | DX PIN | | | | |
|---|---|---|---|---|---|
| ISO | 6 | 4 | 3 | 2 | Sv |
| 25 | 1 | 1 | 1 | 1 | 3 |
| 32 | 0 | 1 | 1 | 1 | 3 ½ |
| 40 | 0 | 1 | 1 | 1 | 3 ½ |
| 50 | 1 | 1 | 1 | 0 | 4 |
| 64 | 0 | 1 | 1 | 0 | 4 ½ |
| 80 | 0 | 1 | 1 | 0 | 4 ½ |
| 100 | 1 | 1 | 0 | 1 | 5 |
| 125 | 0 | 1 | 0 | 1 | 5 ½ |
| 160 | 0 | 1 | 0 | 1 | 5 ½ |
| 200 | 1 | 1 | 0 | 0 | 6 |
| 250 | 0 | 1 | 0 | 0 | 6 ½ |
| 320 | 0 | 1 | 0 | 0 | 6 ½ |
| 400 | 1 | 0 | 1 | 1 | 7 |
| 500 | 0 | 0 | 1 | 1 | 7 ½ |
| 640 | 0 | 0 | 1 | 1 | 7 ½ |
| 800 | 1 | 0 | 1 | 0 | 8 |
| 1000 | 0 | 0 | 1 | 0 | 8 ½ |
| 1250 | 0 | 0 | 1 | 0 | 8 ½ |
| 1600 | 1 | 0 | 0 | 1 | 9 |
| 2000 | 0 | 0 | 0 | 1 | 9 ½ |
| 2500 | 0 | 0 | 0 | 1 | 9 ½ |
| 3200 | 1 | 0 | 0 | 0 | 10 |
| 4000 | 0 | 0 | 0 | 0 | 10 ½ |
| 5000 | 0 | 0 | 0 | 0 | 10 ½ |

To describe the above more concretely, when there exists a value of the second data portion (less than 1 Ev), a value of the second data portion is set to the

TABLE 5

| | PIN | | | | |
|---|---|---|---|---|---|
| ISO | 6 | 4 | 3 | 2 | Sv |
| 25 | 1 | 1 | 1 | 1 | 3 |
| 32 | 0 | 1 | 1 | 1 | 3 ⅓ |
| 40 | 0 | 1 | 1 | 1 | 3 ⅓ |
| 50 | 1 | 1 | 1 | 0 | 4 |
| 64 | 0 | 1 | 1 | 0 | 4 ⅓ |
| 80 | 0 | 1 | 1 | 0 | 4 ⅓ |
| 100 | 1 | 1 | 0 | 1 | 5 |
| 125 | 0 | 1 | 0 | 1 | 5 ⅔ |
| 160 | 0 | 1 | 0 | 1 | 5 ⅔ |
| 200 | 1 | 1 | 0 | 0 | 6 |
| 250 | 0 | 1 | 0 | 0 | 6 ⅔ |
| 320 | 0 | 1 | 0 | 0 | 6 ⅔ |
| 400 | 1 | 0 | 1 | 1 | 7 |
| 500 | 0 | 0 | 1 | 1 | 7 ⅔ |
| 640 | 0 | 0 | 1 | 1 | 7 ⅔ |
| 800 | 1 | 0 | 1 | 0 | 8 |
| 1000 | 0 | 0 | 1 | 0 | 8 ⅓ |
| 1250 | 0 | 0 | 1 | 0 | 8 ⅓ |
| 1600 | 1 | 0 | 0 | 1 | 9 |
| 2000 | 0 | 0 | 0 | 1 | 9 ⅓ |
| 2500 | 0 | 0 | 0 | 1 | 9 ⅓ |
| 3200 | 1 | 0 | 0 | 0 | 10 |
| 4000 | 0 | 0 | 0 | 0 | 10 ⅓ |
| 5000 | 0 | 0 | 0 | 0 | 10 ⅓ | value which is individually determined for each step of the first data portion based on a corresponding relationship shown in Table 5.

The value is set, for example, to ISO 32 (⅓ side) in the case of ISO 32 and 40, to ISO 64 (⅓ side) in the case of ISO 64 and 80, to ISO 160 (⅔ side) in the case of ISO 125 and 160, and to ISO 640 (⅔ side) in the case of ISO 500 and 640.

With this means, when the film sensitivity of a loaded film is equal to the film sensitivity which is et in accordance with the frequency, a set error is 0, so that a possibility to effect an exposure arithmetic operation more accurately than that of the above embodiment is increased in a general application.

If any means shown in Tables 4 and 5 is employed, the reduction of the number of bits of input signals reduces a load upon a CPU and speeds up the arithmetic operation.

Further, as shown in FIG. 2, an aluminum plate 8 forming the outer circumference of a patrone chamber can be extended to a portion where a pin is removed. Thus, a camera body composed of two components can be reinforced.

Figure 3:
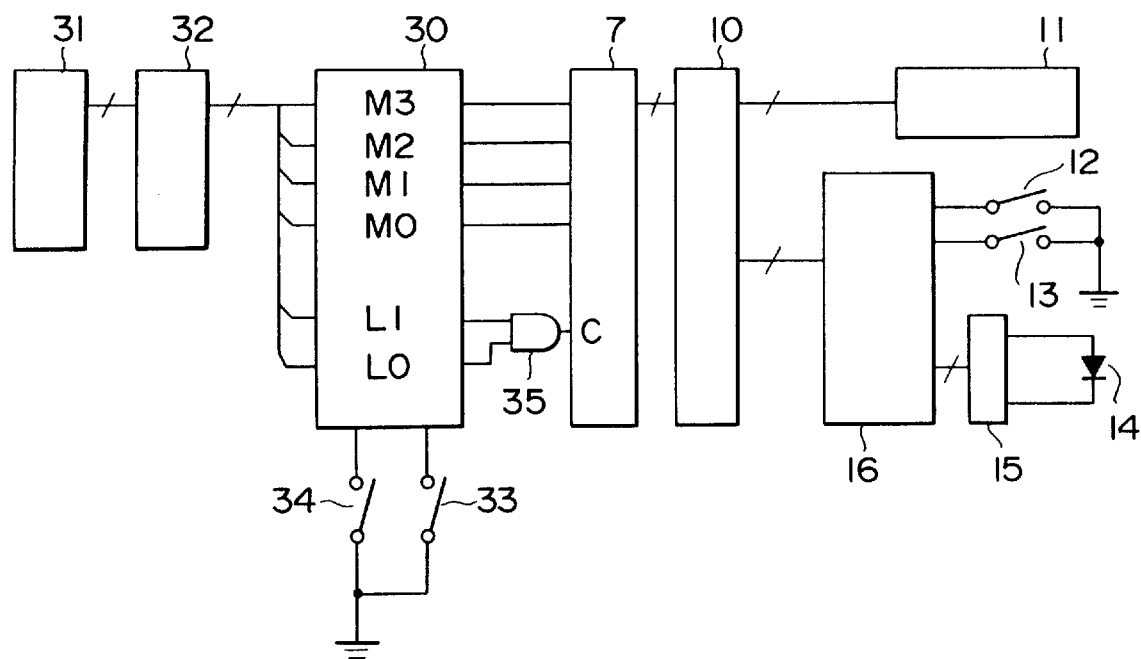
FIG. 3 is a block diagram of a main part of an arithmetic operation system employing a device for processing digital data, which is a second embodiment according to the present invention.
Figure 4:
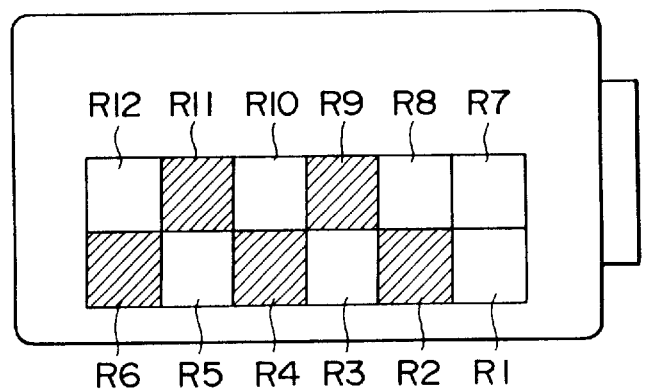
FIG. 4 is a diagram explaining a film patrone on which Dx codes are printed.

FIG. 3 shows a second embodiment of the data processing device of a camera according to the present invention.

This embodiment sets a shutter speed based upon an input though an up/down counter or a code plate, wherein data is detected using 6 bits and an arithmetic operation is executed using 5 bits.

First, a schematic arrangement of the device will be described.

The data processing device comprises a 6 bit up/down counter 30 as a data input means, a liquid crystal display panel 31, a decoder 32, a data processing device 7 for setting a shutter speed to be calculated based on a value of the counter, and an arithmetic operation means 10 for executing an exposure arithmetic operation based on an output from the data processing device 7.

A shutter circuit is driven in response to an output from the arithmetic operation means 10. A light measuring switch 12, a release switch 13, and a light measuring means 15, to which a light receiving element 14 is connected are connected, to the arithmetic operation means 10, respectively, through an interface 16.

An up switch 33 and a down switch 34, for indicating an up and down count of a set value is connected to the up/down counter 30.

In this embodiment, a reference bit serving as a boundary between a first data portion and a second data portion is represented by 1 Tv. In other words, the first data portion and the second data portion of the Tv value corresponds to the integer part and the decimal part thereof, respectively. Terminals M0 to M3 output values of the first data portion and terminals L0 and L1 output values of the second data portion.

Further, the data input means is not restricted to the above up/down counter, but may comprises a combination of a plurality of terminals and a code plate.

The decoder 32 decodes a value of the counter 30 by 6 bits and displays a shutter speed on the liquid crystal panel. The display may display a Tv value such as 1"+0, 1"+¼, . . . .

On the other hand, as data to be inputted to the data processing device 7, codes of M0 to M3 of the first data portion are directly inputted thereto and codes of L0 and L1 are inputted thereto from a C terminal through an AND circuit 35. An input of 1 to the C terminal means that the second data portion (the decimal part of Tv value) is 0 and an input of 0 thereto means that there exists a value in the second data portion.

The data processing device 7 determines whether the data inputted to the terminal C is 0 or not, and when it is not 0, the data processing device 7 sets ½ Ev, i.e., ½ step of the first data portion as a value of the second data portion.

The arithmetic operation means 10 determines a shutter speed based on data output from the data processing device 7, and data such as light measuring data, a film sensitivity and the like.

When a release signal is input by turning on the release switch, a command is applied to a shutter circuit to open and close a shutter based on set shutter speed data.

Next, three examples of a means for setting a shutter speed will be described below with reference to Tables 6 to 8.

In the example of Table 6, original Tv (org. Tv) is set by ¼ Ev step.

In this case, when an Tv value is set, bit 0 (the LSB, or Least Significant Bit) is set to data L0, bit 1 is set to L1, bit 2 is set to M0, bit 3 is set to M1, bit 4 is set to M2, and bit 5 (the MSB; or Most Significant Bit) is set to M3 in the up/down counter, and an arithmetic operation is executed using 5 bits, i.e. a value C, an output of AND'ed L0 and L1, and M3 to M0.

TABLE 6

| org. Tv | shutter | M0 | M1 | M2 | M3 | C | L0 | L1 | cnv Tv |
|---|---|---|---|---|---|---|---|---|---|
| 0 | 1 | 1 | 1 | 1 | 1 | 1 | 1 | 1 | 0 |
| 0¼ |  | 1 | 1 | 1 | 1 | 0 | 0 | 1 | 0½ |
| 0²⁄₄ |  | 1 | 1 | 1 | 1 | 0 | 1 | 0 | 0½ |
| 0¾ |  | 1 | 1 | 1 | 1 | 0 | 0 | 0 | 0½ |
| 1 | ½ | 0 | 1 | 1 | 1 | 1 | 1 | 1 | 1 |
| 1¼ |  | 0 | 1 | 1 | 1 | 0 | 0 | 1 | 1½ |
| 1²⁄₄ |  | 0 | 1 | 1 | 1 | 0 | 1 | 0 | 1½ |
| 1¾ |  | 0 | 1 | 1 | 1 | 0 | 0 | 0 | 1½ |
| 2 | ¼ | 1 | 0 | 1 | 1 | 1 | 1 | 1 | 2 |
| 2¼ |  | 1 | 0 | 1 | 1 | 0 | 0 | 1 | 2½ |
| . | . | . | . | . | . | . | . | . | . |
| . | . | . | . | . | . | . | . | . | . |
| . | . | . | . | . | . | . | . | . | . |
| 9 | ¹⁄₅₀₀ | 0 | 1 | 1 | 0 | 1 | 1 | 1 | 9 |
| 9¼ |  | 0 | 1 | 1 | 0 | 0 | 0 | 1 | 9½ |
| 9²⁄₄ |  | 0 | 1 | 1 | 0 | 0 | 1 | 0 | 9½ |
| 9¾ |  | 0 | 1 | 1 | 0 | 0 | 0 | 0 | 9½ |
| 10 | ¹⁄₁₀₀₀ | 1 | 0 | 1 | 0 | 1 | 1 | 1 | 10 |

In the case where the original Tv is set by ⅓ step, if a value less than 1 Ev is set to ⅓ Ev or ⅔ Ev, a maximum error of ⅓ Ev is produced. Then, an intermediate value of them is employed, that is, they are rounded-off to a value of ½ Ev (cnv. Tv).

In the example of Table 7, the values of L0 and L1, which are caused to correspond to the weight of a regular binary code, are ANDed to determine whether the second data portion is 0 or not (refer to FIG. 3).

TABLE 7

| org. Tv | shutter | M0 | M1 | M2 | M3 | C | L0 | L1 | cnv. Tv |
|---|---|---|---|---|---|---|---|---|---|
| 0⁰⁄₃ | 1 | 1 | 1 | 1 | 1 | 1 | 1 | 1 | 0 |
| 0⅓ |  | 1 | 1 | 1 | 1 | 0 | 0 | 1 | 0½ |
| 0⅔ |  | 1 | 1 | 1 | 1 | 0 | 1 | 0 | 0½ |
| 1⁰⁄₃ | ½ | 0 | 1 | 1 | 1 | 1 | 1 | 1 | 1 |
| 1⅓ |  | 0 | 1 | 1 | 1 | 0 | 0 | 1 | 1½ |
| 1⅔ |  | 0 | 1 | 1 | 1 | 0 | 1 | 0 | 1½ |

Figure 5:
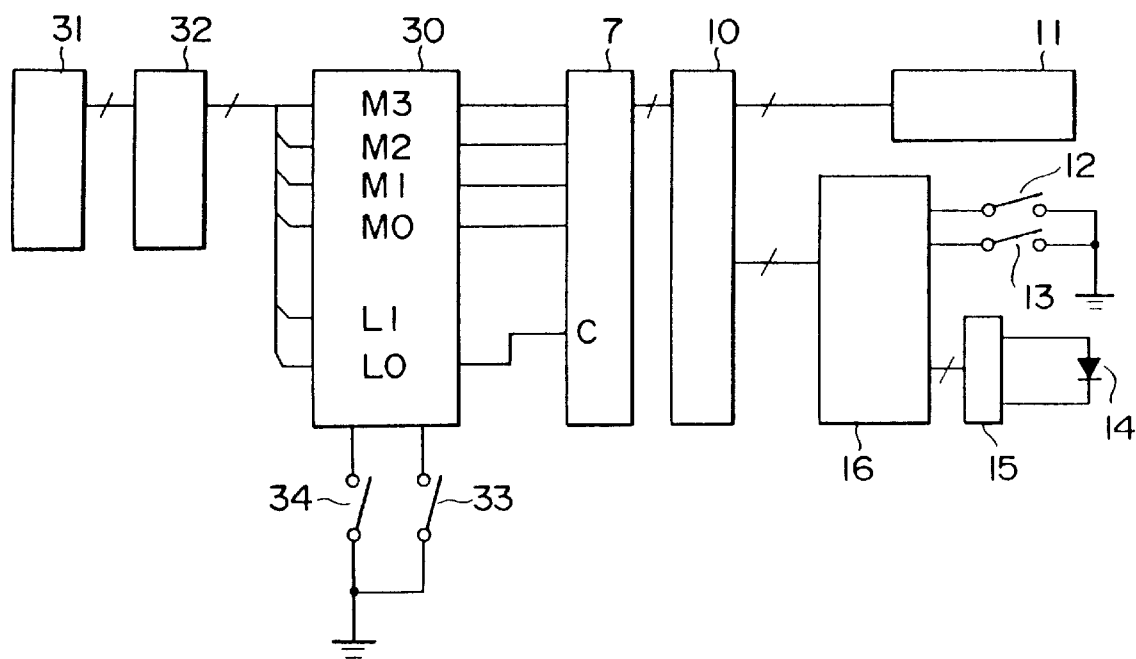
FIG. 5 is a block diagram of a main part of an arithmetic operation system employing a device for processing digital data, which is a modification of the second embodiment according to the present invention.

In the example of Table 8, the values of L0 and L1 are caused to correspond to the weight of an irregular binary code to cover the bit C of Table 7 by the value of L0, so that whether a value of the second data portion is 0 or not can be determined only by a signal of L0 (refer to FIG. 5).

TABLE 8

| org. Tv | shutter | M0 | M1 | M2 | M3 | C | L0 | L1 | cnv. Tv |
|---|---|---|---|---|---|---|---|---|---|
| 0⁰⁄₃ | 1 | 1 | 1 | 1 | 1 | 1 | 1 | 1 | 0 |
| 0⅓ |  | 1 | 1 | 1 | 1 | 0 | 0 | 1 | 0½ |
| 0⅔ |  | 1 | 1 | 1 | 1 | 0 | 0 | 0 | 0½ |
| 1⁰⁄₃ | ½ | 0 | 1 | 1 | 1 | 1 | 1 | 1 | 1 |
| 1⅓ |  | 0 | 1 | 1 | 1 | 0 | 0 | 1 | 1½ |
| 1⅔ |  | 0 | 1 | 1 | 1 | 0 | 0 | 0 | 1½ |

Usually, a load is imposed on software or hardware to provide irregular inputs with regularity, but such a load is not imposed here because this can be achieved only by detecting whether a bit L0 is 1 or 0.

As described above, according to the data processing device of a camera of the present invention, since a smaller amount of data is input, the number of mechanical parts can be reduced. The reduction in the number of bits of RAM not only improves the efficiency of the arithmetic operation time of the CPU, but also reduces the capacity of the RAM necessary for the arithmetic operation, whereby the cost of the CPU can be reduced.

What is claimed is:

1. A device for processing digital data of a DX code provided on a film cartridge, said digital data being associated with film sensitivity, said device comprising:

means for inputting a predetermined portion of said digital data representing said DX code, said predetermined portion being less than all of said digital data;

means for determining whether said predetermined portion of said digital data represents more than one film sensitivity;

means for assigning an estimated value of film sensitivity to film in said film cartridge when said determining means determines that said predetermined portion of said digital data represents more than one film sensitivity, and for assigning a precise value of film sensitivity to film in said film cartridge when said determining means determines that said predetermined portion of said digital data does not represent more than one film sensitivity;

means for processing said predetermined portion inputted by said inputting means to obtain a processed value corresponding to film sensitivity, said assigning means comprising means for modifying said processed value when said determining means determines that said predetermined portion of said digital data represents more than one film sensitivity, wherein said predetermined portion of said digital data includes a first data portion representing a portion of the film sensitivity measured in increments of Ev and a second data portion representing another portion of the film sensitivity measured in fractional increments of Ev, said modifying means adding a ½ Ev increment to said processed value when said second data portion of said predetermined portion is equal to 0.

2. A device for processing digital data of a DX code provided on a film cartridge, said digital data being associated with film sensitivity, said device comprising:

means for inputting a predetermined portion of said digital data representing said DX code, said predetermined portion being less than all of said digital data;

means for determining whether said predetermined portion of said digital data represents more than one film sensitivity;

means for assigning an estimated value of film sensitivity to film in said film cartridge when said determining means determines that said predetermined portion of said digital data represents more than one film sensitivity, and for assigning a precise value of film sensitivity to film in said film cartridge when said determining means determines that said predetermined portion of said digital data does not represent more than one film sensitivity;

means for processing said predetermined portion inputted by said inputting means to obtain a processed value corresponding to film sensitivity, said assigning means comprising means for modifying said processed value when said determining means determines that said predetermined portion of said digital data represents more than one film sensitivity, wherein said predetermined portion of said digital data includes a first data portion representing a portion of the film sensitivity measured in increments of Ev and a second data portion representing another portion of the film sensitivity measured in fractional increments of Ev, said modifying means modifying said processed value to correspond to a predetermined, frequently used film sensitivity when said second data portion of said predetermined portion is equal to 0, said modifying means adding a $\frac{1}{3}$ Ev increment to said processed value.

3. A device for processing digital data of a DX code provided on a film cartridge, said digital data consisting of a predetermined number of digits associated with film sensitivity, said device comprising:

means for inputting a truncated portion of said digits of said digital data, said truncated portion being less than all of said data;

means for processing said truncated portion so that a value corresponding to the film sensitivity is obtained;

means for determining whether said truncated portion of said digital data inputted by said inputting means represents more than one film sensitivity;

means for modifying said value processed by said processing means with predetermined data when said determining means determines that said truncated portion of said digital data represents more than one film sensitivity, wherein said modifying means modifies said value to correspond to a predetermined, frequently used film sensitivity when said determining means determines that said truncated portion of said digital data represents more than one film sensitivity, said modifying means adding a $\frac{1}{3}$ Ev increment to said value.

4. A device for processing digital data in a camera, said digital data comprising a predetermined number of digits associated with a shutter speed, said device comprising:

means for receiving a significant portion of said digital data, said significant portion comprising less than all of said predetermined number of digits, said significant portion representing a value of said shutter speed, and for receiving a predetermined reference portion of said digital data, said reference portion comprising a remainder of said predetermined number of digits of said digital data;

means for performing a predetermined arithmetic operation on said predetermined reference portion received by said receiving means, and outputting the result of said operation;

means for receiving said result and means for selectively modifying said significant portion of said digital data received by said receiving means with a predetermined constant value, in response to said result, and outputting a selectively-modified value, said selectively-modified value having less digits than the total number of digits of said digital data received; and means for controlling shutter speed of the camera based on the selectively-modified value outputted by said modifying means, said arithmetic operation means performing an AND operation on said predetermined reference portion of said predetermined number of digits.

5. A device for processing digital data of a DX code provided on a film cartridge, said digital data being associated with film sensitivity, said device comprising:

means for inputting a predetermined portion of said digital data representing said DX code, said predetermined portion being less than all of said digital data;

means for determining whether said predetermined portion of said digital data represents more than one film sensitivity;

means for assigning an estimated value of film sensitivity to film in said film cartridge when said determining means determines that said predetermined portion of said digital data represents more than one film sensitivity, and for assigning a precise value of film sensitivity to film in said film cartridge when said determining means determines that said predetermined portion of said digital data does not represent more than one film sensitivity;

means for processing said predetermined portion inputted by said inputting means to obtain a processed value corresponding to film sensitivity, said assigning means comprising means for modifying said processed value when said determining means determines that said predetermined portion of said digital data represents more than one film sensitivity, wherein said predetermined portion of said digital data includes a first data portion representing a portion of the film sensitivity measured in increments of Ev and a second data portion representing another portion of the film sensitivity measured in fractional increments of Ev, said modifying means modifying said processed value to correspond to a predetermined, frequently used film sensitivity when said second data portion of said predetermined portion is equal to 0, said modifying means adding a $\frac{2}{3}$ Ev increment to said processed value.

6. A device for processing digital data of a DX code provided on a film cartridge, said digital data consisting of a predetermined number of digits associated with film sensitivity, said device comprising:

means for inputting a truncated portion of said digits of said digital data, said truncated portion being less than all of said data;

means for processing said truncated portion so that a value corresponding to the film sensitivity is obtained;

means for determining whether said truncated portion of said digital data inputted by said inputting means represents more than one film sensitivity;

means for modifying said value processed by said processing means with predetermined data when said determining means determines that said truncated portion of said digital data represents more than one film sensitivity, wherein said modifying means modifies said value to correspond to a predetermined, frequently used film sensitivity when said determining means determines that said truncated portion of said digital data represents more than one film sensitivity, said modifying means adding a $\frac{2}{3}$ Ev increment to said value.

* * * * *